United States Patent Office 3,079,395
Patented Feb. 26, 1963

3,079,395
NOVEL 2-OXO-BENZOQUINOLIZINE DERIVATIVES
Arnold Brossi and Otto Schnider, Basel, Switzerland, assignors to Hoffmann-La Roche, Inc., Nutley, N.J., a corporation of New Jersey
No Drawing. Filed Mar. 26, 1958, Ser. No. 723,977
Claims priority, application Switzerland Apr. 2, 1957
11 Claims. (Cl. 260—287)

This invention relates to 2-oxo-benzoquinolizine derivatives, and to novel processes and novel intermediates useful in the preparation thereof.

In one comprehensive embodiment, the invention provides a process which comprises (a) reacting a compound having the formula (I)
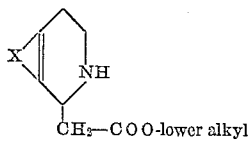
$CH_2$—C O O-lower alkyl wherein X represents a divalent radical selected from the group consisting of buta-1,3-dien-1,4-ylene, i.e.

—CH=CH—CH=CH— mono(lower alkoxy)-buta-1,3-dien-1,4-ylene, e.g.

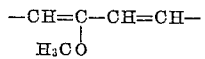

di(lower alkoxy)-buta-1,3-dien-1,4-ylene, e.g.

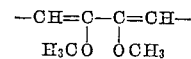

tri(lower alkoxy)-buta-1,3-dien-1,4-ylene, e.g.

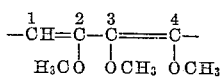

and lower alkylenedioxy-buta-1,3-dien-1,4-ylene, e.g.

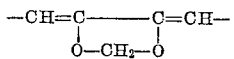

with a member selected from the group consisting of lower alkyl acrylate, e.g. $CH_2$=CH—COOCH$_3$ or $CH_2$=CH—COO—n-$C_3H_7$ and lower alkyl β-halopropionate, e.g.

$BrCH_2CH_2COOCH_3$ or $ClCH_2CH_2COOC_2H_5$ thereby forming a compound having the formula (II)
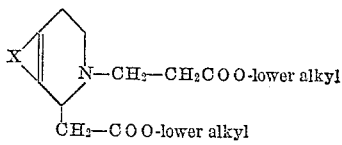

wherein X has the same meaning indicated above; (b) cyclizing Compound II, thereby forming a compound having the formula (III)
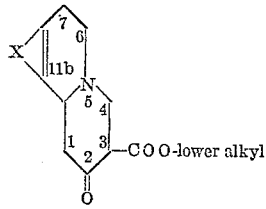

wherein X has the same meaning indicated above; and (c) subjecting Compound III to hydrolysis-decarboxylation, thereby forming a compound having the formula (IV)
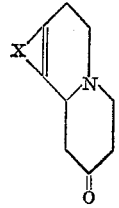

wherein X has the same meaning indicated above.

The 1-lower carbalkoxymethyl-1,2,3,4-tetrahydroisoquinolines of Formula I above, required as starting materials, can be produced according to methods known per se [cf. J. Chem. Soc. (London), 1951, 3472, and 1953, 2465] by reaction of the corresponding β-substituted ethylamines with malonic acid ester, cyclization of the thus obtained half ester-amides, and catalytic hydrogenation of the cyclized products.

In the first stage (a) of the comprehensive embodiment referred to above, the lower carbalkoxymethyl-tetrahydroisoquinoline starting material, Formula I above, is condensed with a lower alkyl acrylate (e.g. methyl acrylate, ethyl acrylate, etc.) or with a lower alkyl β-halopropionate (e.g. methyl β-chloropropionate, ethyl β-bromopropionate, etc.). The condensation is effected, for example, at a temperature between about 50° C. and about 100° C. In the event that an acrylic acid ester is selected as one of the reactants, added solvent is superfluous. It is nevertheless advantageous to use an excess of the acrylic acid ester, for example, ten times the theoretically required quantity. On the other hand, if the condensation is effected by means of a β-halopropionic acid ester, the reaction is advantageously carried out in an organic solvent, e.g. acetone or benzene, and in the presence of an acid binding agent, e.g. potassium carbonate. The β-[1-lower carbalkoxymethyl-tetrahydroisoquinolinyl-(2)]-propionic acid esters of Formula II, obtained as products of the first stage (a) referred to above, are compounds of basic character; they are soluble in acids, but are insoluble in water and alkalis.

In the second stage (b) of the comprehensive embodiment referred to above, the di-esters of Formula II are converted by ring closure via a Dieckmann reaction to the corresponding 2-oxo-3-lower carbalkoxy-1,2,3,4,6,7-hexahydro - 11bH - benzo[a]quinolizines, Formula III above—numbering per "Ring Index" No. 1957. It is appropriate to effect the cyclization in an inert solvent, e.g. benzene, ether or toluene, in the presence of a conventional condensation agent, e.g. an alkali metal alcoholate, boron trifluoride or sodium hydride. In a preferred mode of execution, the di-ester, in dry benzene and in the presence of sodium ethylate, is heated while continuously removing by azeotropic distillation the alcohol formed by condensation. The quinolizine derivatives of Formula III above, thus obtained, are basic compounds, which are easily soluble in acids and in the ordinary organic solvents, e.g. ethanol. They exhibit the typical enol reaction with ferric chloride. They are useful as intermediates for the preparation of a variety of substituted benzoquinolizines, as indicated below.

In the third stage (c) of the comprehensive embodiment referred to above, the esters of Formula III are subjected to hydrolysis-decarboxylation. This step can be effected according to methods known per se. The splitting off of the carbalkoxy group can be effected both by treatment with acidic reagents, for example mineral acids, such as aqueous hydrochloric acid; and alkaline reagents, for example alkaline lyes, such as dilute aqueous sodium hydroxide solution. According to a preferred mode of execution, the compounds of Formula III above are refluxed with 3 N aqueous hydrochloric acid solution.

In a second comprehensive embodiment, the invention provides a process which comprises (a) reacting a compound of Formula III above with a non-benzenoid 1-halohydrocarbon which is unsaturated in β-position to the halogen atom, thereby forming a compound having the formula (V)

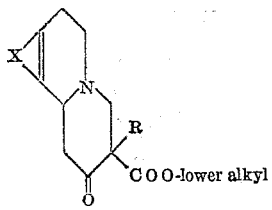

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxy-buta-1,3-dien-1,4-ylene; and R represents a monovalent non-benzenoid β-unsaturated hydrocarbon radical; (b) subjecting Compound V to hydrolysis-decarboxylation, thereby forming a compound having the formula (VI)

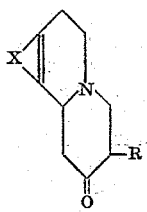

wherein each of X and R has the same meaning indicated above; and (c) hydrogenating Compound VI, thereby forming a compound having the formula (VII)

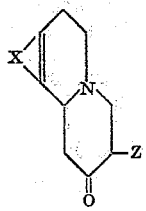

wherein X has the same meaning indicated above and Z represents a monovalent non-benzenoid β-saturated hydrocarbon radical.

Illustrative non-benzenoid 1-halohydrocarbons unsaturated in the β-position which can be employed in the first step (a) of the second comprehensive embodiment referred to above are, for example, allyl bromide, methallyl chloride, γ,γ-dimethylallyl bromide, propargyl bromide and 2-cyclohexen-1-yl bromide. The reaction of compound III with the non-benzenoid 1-halohydrocarbon can be effected in an aqueous lye in the presence of a catalytic quantity of copper. In a preferred mode of execution of this stage, the keto-ester, Compound III, is stirred with the non-benzenoid 1-halohydrocarbon in the presence of a little copper powder and in the calculated quantity of an aqueous lye.

The second stage (b) of the second comprehensive embodiment referred to above comprises hydrolysis and decarboxylation to the corresponding 2-oxo-3-unsaturated-hydrocarbyl compound. If the radical R which is present in the 3-position of Compound V is an alkenyl radical, it is advantageous to effect the hydrolysis-decarboxylation by heating Compound V in alkaline medium. According to a preferred mode of execution, the 3-alkenyl-3-lower carbalkoxy-2-oxo compound of Formula V is refluxed in alcoholic sodium hydroxide solution. The 3-β-unsaturated-hydrocarbyl-substituted compounds of Formula VI can be reduced to the corresponding 2-oxo-3-β-saturated-hydrocarbyl compounds of Formula VII by conventional methods.

The last stage (c) in the second comprehensive embodiment referred to above comprises such reduction. Reduction can be effected, for example, by reaction with catalytically activated hydrogen. Appropriate catalysts are Raney nickel or palladium-on-carbon. It is advantageous to effect the catalytic reduction in an inert organic solvent, e.g. methanol or ethanol.

In a third comprehensive embodiment, the invention provides a process which comprises (a) reducing a compound of Formula V above, thereby forming a compound having the formula (VIII)

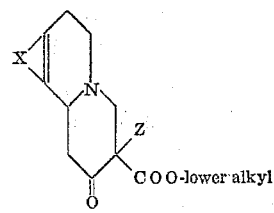

wherein each of X and Z has the same meaning indicated above; and (b) subjecting Compound VIII to hydrolysis-decarboxylation, thereby forming a compound having Formula VII above.

The first stage (a) of this third comprehensive embodiment comprises reduction of the 2-oxo-3-lower carbalkoxy-3-β-unsaturated-hydrocarbyl benzoquinolizine compound of Formula V to the corresponding 2-oxo-3-lower carbalkoxy-3-β-saturated-hydrocarbyl compound of Formula VIII. This reduction can be effected by methods known per se, e.g. by catalytic reduction. The reduction is advantageously effected in a solvent such as a lower alkanol. Raney nickel and palladium-on-carbon hydrogenation catalysts are suitable for this stage.

The second stage (b) of the third comprehensive embodiment referred to above comprises hydrolysis and decarboxylation of the intermediate of Formula VIII to the 2-oxo-3-β - saturated-hydrocarbyl - hexahydrobenzoquinolizine of Formula VII. The hydrolysis and decarboxylation can be effected both by reaction with acidic and with alkaline hydrolyzing agents. In a preferred mode of execution, the hydrolysis is effected by means of dilute mineral acid, e.g. 3 N aqueous hydrochloric acid.

The 2-oxo-hexahydro-11bH-benzo[a]quinolizines of Formula IV above and the 2-oxo-3-hydrocarbyl-hexahydro-11bH-benzo[a]quinolizines of Formulas VI and VII above are bases which are only difficultly soluble in water. However, they form acid addition salts which are readily soluble in water, with the acids ordinarily employed for the preparation of pharmaceuticals; e.g., inorganic acids, such as hydrochloric and phosphoric acids; organic acids, such as tartaric, acetic and citric acids; and the like. The bases and their salts have pharmacological activity, for example as narcosis-potentiators; and are useful as medicinal agents, more particularly as reserpine-like tranquillizing agents.

The invention is further disclosed in the following examples, which are illustrative but not limitative thereof. Temperatures are stated in degrees centigrade.

*Example 1*

54 g. of 1 - carbethoxymethyl-6,7-dimethoxy-1,2,3,4-tetrahydroisoquinoline and 100 cc. of ethyl acrylate were refluxed for 24 hours. The reaction mixture was cooled, and diluted with an equal volume of ether, and the basic portions were extracted with 3 N hydrochloric acid. The hydrochloric acid extract was mixed with ammonia solution, while cooling with ice, until the mixture reacted alkaline to phenolphthalein, and the bases which separated were taken up in ether. The ethereal solution was dried over sodium sulfate, filtered and concentrated, and the residue was distilled in high vacuum. There was thus obtained 65 g. of β-[1-carbethoxymethyl-6,7-dimethoxy- 1,2,3,4-tetrahydroisoquinolyl-(2)]-propionic acid ethyl ester, which distilled between 197°–201° at 0.02 mm., $n_D{}^{22}$=1.5235. After standing for some time, the distillate solidified, M.P. 37°–39° after recrystallization from low boiling petroleum ether.

2.49 g. of sodium was dissolved in 90 cc. of absolute ethyl alcohol and the solvent was distilled off in a water pump vacuum. To the dry sodium ethylate was then added 34.2 g. of β-[1-carbethoxymethyl-6,7-dimethoxy-1,2,3,4-tetrahydroisoquinolyl-(2)]-propionic acid ethyl ester dissolved in 600 cc. of dry benzene. The reaction mixture was heated while stirring, and alcohol formed by condensation was distilled off azeotropically. The distillation was interrupted when the temperature reached 78°. Then the reaction mixture was refluxed for one hour, cooled and extracted with 3 N sodium hydroxide solution and water until the benzene solution no longer gave an enol reaction with ferric chloride. The aqueous alkaline extracts were combined, cooled with ice and then carbon dioxide was introduced. In this manner there was obtained 18 g. of 2-oxo-3-carbethoxy-9,10-dimethoxy-1,2,3,4,6,7 - hexahydro-11bH-benzo[a]quinolizine, which melted at 114°–115° after recrystallization from alcohol. The hydrochloride, prepared by means of alcoholic-ethereal hydrogen chloride, melted at 193°–194°, after recrystallization from alcohol-ether.

11 g. of the keto carboxylic acid ester was dissolved in 100 cc. of 3 N hydrochloric acid and refluxed for 5 hours. The reaction mixture was cooled, washed with ether, and made alkaline to phenolphthalein by addition of ammonia. After standing in the cold, 8.0 g. of 2-oxo-9,10-dimethoxy-1,2,3,4,6,7-hexahydro-11bH-benzo[a]quinolizine crystallized, M.P. 150°–151° after recrystallization from methanol. The hydrochloride, prepared by means of alcoholic-ethereal HCl, melted at 160°–161°. A form containing one mol of water of crystallization also crystallized, M.P. 151°–152°.

Example 2

9.0 g. of 1-carbethoxymethyl-6,7-dimethoxy-1,2,3,4-tetrahydroisoquinoline was dissolved in 30 cc. of acetone, 15 g. of dry potassium carbonate and 6 g. of ethyl β-bromopropionate were added, and the mixture was refluxed for 24 hours while stirring. The reaction mixture was filtered and the residue was washed with acetone; the washings were added to the filtrate, and the combined liquors were concentrated. The residue was dissolved in ether and the basic portions were extracted with 3 N HCl. The HCl extract was made alkaline to phenolphthalein by addition of ammonia and was then extracted with ether. The extract was dried over sodium sulfate, filtered, concentrated and the residue was distilled in high vacuum. There was thus obtained 6.5 g. of β-[1-carbethoxymethyl - 6,7 - dimethoxy - 1,2,3,4 - tetrahydroisoquinolyl-(2)]-propionic acid ethyl ester, which distilled at 190–200° at 0.02 mm. The distillate solidified upon cooling; a sample, recrystallized from petroleum ether, was identical with the preparation of Example 1, according to melting point and mixed melting point determinations.

Cyclization, saponification and decarboxylation, effected according to the indications in Example 1, yielded 2-oxo-9,10 - dimethoxy - 1,2,3,4,6,7-hexahydro-11bH-benzo[a]-quinolizine, M.P. 150°–151°.

Example 3

36.5 g. of β-[1-carbethoxymethyl-6,7-dimethoxy-1,2,3,4-tetrahydroisoquinolyl-(2)]-propionic acid ethyl ester, prepared according to Example 1, was dissolved in 100 cc. of absolute benzene, mixed with 2.9 g. of sodium hydride and refluxed for one hour. The reaction mixture was worked up in the manner indicated in Example 1, yielding 15 g. of 2-oxo-3-carbethoxy-9,10-dimethoxy-1,2,3,4,6,7-hexahydro-11bH-benzo[a]quinolizine, M.P. 114°–115°.

Example 4

12 g. of 1-carbethoxymethyl-6-methoxy-1,2,3,4-tetrahydroisoquinoline was condensed with ethyl acrylate, similarly to Example 1. The β-[1-carbethoxymethyl-6-methoxy-1,2,3,4-tetrahydroisoquinolyl - (2)] - propionic acid ethyl ester produced was purified by distillation in high vacuum, yielding 12 g. of a colorless oil, B.P. 170°–175°/0.03 mm., $n_D{}^{24}$=1.5168. The Dieckmann condensation reaction, effected according to the indications in Example 1, yielded 5.3 g. of 2-oxo-3-carbethoxy-9-methoxy - 1,2,3,4,6,7 - hexahydro-11bH-benzo[a]quinolizine of M.P. 132°. The keto ester gave a violet enol reaction with ferric chloride.

4.7 g. of the keto ester in 50 cc. of 20% hydrochloric acid was refluxed for ¾ hour. After concentration of the residue there was obtained 3.5 g. of 2-oxo-9-methoxy-1,2,3,4,6,7 - hexahydro-11bH-benzo[a]quinolizine hydrochloride, M.P. 198°–199° after recrystallization from 80% acetic acid-ether.

The starting material, 1-carbethoxymethyl-6-methoxy-1,2,3,4-tetrahydroisoquinoline, was obtained from m-methoxyphenylethylamine (J. Chem. Soc. London, 1956, 329) as follows: Condensation with diethyl malonate yielded m-methoxyphenylethyl-malonic acid half ester amide, which crystallized from petroleum ether in the form of fine needles having M.P. 42°. Cyclization of the half ester amide with phosphorus oxychloride in benzene and catalytic hydrogenation of the thus obtained dihydro base in glacial acetic acid with platinum dioxide yielded the desired tetrahydroisoquinoline. The oxalate, prepared by means of oxalic acid in acetone, melted at 148°–150°. The base, liberated from the oxalate by potassium carbonate solution, is a light yellow oil of B.P. 130°–132°/0.02 mm., $n_D{}^{24}$=1.5357.

Example 5

12 g. of 1-carbethoxymethyl-6,7-methylenedioxy-1,2,3,4-tetrahydroisoquinoline and 24 cc. of ethyl acrylate were condensed according to the indications in Example 1. The di-ester obtained was distilled in high vacuum, B.P. 180°–183°/0.01 mm. (11 g.).

11 g. of the di-ester was cyclized by a Dieckmann reaction according to Example 1, yielding 4.3 g. of 2-oxo-3-carbethoxy-9,10-methylenedioxy - 1,2,3,4,6,7 - hexahydro-11bH-benzo[a]quinolizine having M.P. 126°. Enol reaction with ferric chloride.

3 g. of the keto ester, upon hydrolysis and decarboxylation with 3 N HCl according to the indications in Example 1, yielded 2 g. of 2-oxo-9,10-methylenedioxy-1,2,3,4,6,7-hexahydro-11bH-benzo[a]quinolizine hydrochloride of M.P. 200°. The base, liberated from the hydrochloride by sodium hydroxide solution, melted at 141°–142° after recrystallization from alcohol.

The starting material required, 1-carbethoxymethyl-6,7-methylenedioxy-1,2,3,4-tetrahydroisoquinoline, was obtained from homopiperonylamine as follows: Condensation with diethyl malonate yielded the half ester amide, M.P. 96–98°. Cyclization of the half ester amide with phosphorus oxychloride in benzene yielded 1-carbethoxymethyl-6,7-methylenedioxy-3,4-dihydroisoquinoline, yellow crystals, M.P. 144–146°. Catalytic hydrogenation of the latter in glacial acetic acid with platinum oxide catalyst yielded the required tetrahydroisoquinoline, B.P. 145°/0.03 mm., M.P. 58°.

Example 6

12 g. of 1-carbethoxymethyl-6,7,8-trimethoxy-1,2,3,4-tetrahydroisoquinoline and 24 cc. of ethyl acrylate were condensed according to the indications in Example 1. The di-ester, obtained by working up in the manner previously indicated, was distilled in high vacuum, B.P. 180°/0.01 mm. 12 g. of the di-ester, upon Dieckmann condensation according to Example 1, yielded 4.6 g. of the corresponding keto ester having M.P. 106°; violet enol reaction with ferric chloride. Hydrolysis and decarboxylation, as in the previous examples, yielded 3.5 g.

of 2-oxo-9,10,11-trimethoxy-1,2,3,4,6,7-hexahydro-11bH-benzo[a]quinolizine hydrochloride, M.P. 190°. Base, M.P. 105°.

The required starting material, 1-carbethoxymethyl-6,7,8-trimethoxy-1,2,3,4-tetrahydroisoquinoline, was obtained from mescaline as follows: Condensation with diethyl malonate to the half ester amide, M.P. 67°; cyclization with phosphorus oxychloride in benzene to 1-carbethoxymethyl - 6,7,8 - trimethoxy-3,4-dihydroisoquinoline, M.P. 120°; and catalytic hydrogenation in glacial acetic acid with platinum oxide catalyst to the desired product, a light yellow liquid having B.P. 168°/0.01 mm.

Example 7

19.8 g. of 2-oxo-3-carbethoxy-9,10-dimethoxy-1,2,3,4,6,7-hexahydro-11bH-benzo[a]quinolizine, prepared according to Example 1, was mixed with 60 cc. of water and 5.6 cc. of freshly distilled allyl bromide. 200 mg. of copper powder was added and the mixture was stirred vigorously while adding dropwise 61 cc. of 1 N sodium hydroxide solution. After the addition was completed, the mixture was stirred for an additional period of 30 minutes. The oil which separated was taken up in ether, the ether solution was washed with a 3 N NaOH solution and then with water, and then was extracted with 3 N hydrochloric acid solution. Upon standing overnight, 10.8 g. of the hydrochloride of 2-oxo-3-allyl-3-carbethoxy-9,10-dimethoxy-1,2,3,4,6,7-hexahydro - 11bH - benzo[a]quinolizine crystallized, M.P. 156°. The keto-ester base, liberated from the hydrochloride by alkali, crystallized from alcohol in the form of prisms having M.P. 118°. The keto-ester base gave no color reaction upon mixing with alcoholic ferric chloride solution.

10 g. of 2-oxo-3-allyl-3-carbethoxy-9,10-dimethoxy-1,2,3,4,6,7-hexahydro-11bH-benzo[a]quinolizine was refluxed for three hours in 300 cc. of 5% alcoholic sodium hydroxide solution. The reaction mixture was concentrated in vacuo, mixed with water, filtered, dried, and the residue was recrystallized from ethyl acetate-petroleum ether. There was thus obtained 3.5 g. of 2-oxo-3-allyl-9,10-dimethoxy-1,2,3,4,6,7-hexahydro-11bH-benzo[a]quinolizine having M.P. 114°–116°. Hydrobromide, M.P. 205°. Oxime, M.P. 164°.

By working in the manner described in this example, there were also prepared, from 2-oxo-3-carbethoxy-9,10-dimethoxy - 1,2,3,4,6,7 - hexahydro-11bH-benzo[a]quinolizine, by alkenylation with methallyl chloride and γ,γ-dimethylallyl bromide, respectively, hydrolysis and decarboxylation with alcoholic sodium hydroxide, the following quinolizine-ketones:

2-oxo-3-methallyl-9,10-dimethoxy - 1,2,3,4,6,7 - hexahydro-11bH-benzo[a]quinolizine, M.P. 138°;

2-oxo-3-γ,γ-dimethylallyl-9,10-dimethoxy - 1,2,3,4,6,7-hexahydro-11bH-benzo[a]quinolizine, M.P. 131°; hydrobromide, M.P. 190°.

Example 8

9.4 g. of 2-oxo-3-allyl-3-carbethoxy-9,10-dimethoxy-1,2,3,4,6,7-hexahydro-11bH-benzo[a]quinolizine hydrochloride, obtained according to Example 7, was dissolved in 300 cc. of ethanol and was hydrogenated with 3 g. of 5% palladium-carbon catalyst. After the theoretical amount of hydrogen had been taken up, the reaction mixture was filtered, concentrated to dryness, dissolved in 300 cc. of 3 N HCl and refluxed for six hours. The mixture was washed with ether, made alkaline with sodium hydroxide solution, and the basic portions were extracted with ether. The residue was dissolved in acetone and mixed with alcoholic hydrogen chloride, whereupon 4.5 g. of 2-oxo-3-n-propyl - 9,10 - dimethoxy-1,2,3,4,6,7-hexahydro-11bH-benzo[a]quinolizine hydrochloride crystallized, M.P. 200°–202°. The base, liberated from the hydrochloride by the action of alkali, melted at 102° after recrystallization from methanol-water. Oxime, M.P. 158°.

Example 9

10 g. of 2-oxo-3-allyl-9,10-dimethoxy-1,2,3,4,6,7-hexahydro-11bH-benzo[a]quinolizine, obtained according to Example 7, was dissolved in 300 cc. of methanol and hydrogenated at room temperature with 2 g. of Raney nickel. After the theoretical amount of hydrogen had been taken up, the hydrogenation was interrupted, the catalyst was filtered off and the filtrate was concentrated. There was thus obtained 8.0 g. of 2-oxo-3-n-propyl-9,10-dimethoxy - 1,2,3,4,6,7 - hexahydro-11bH-benzo[a]quinolizine, M.P. 102° after crystallization from alcohol-water. This preparation was identical with that prepared in Example 8.

In similar manner, catalytic hydrogenation of the ketones prepared in Example 7, in ethanol using palladium-carbon catalyst, resulted in the following quinolizines:

2 - oxo - 3-isobutyl-9,10-dimethoxy-1,2,3,4,6,7-hexahydro-11bH-benzo[a]quinolizine, M.P. 123°. Hydrobromide, M.P. 202°.

2 - oxo - 3-isoamyl-9,10-dimethoxy-1,2,3,4,6,7-hexahydro-11bH-benzo[a]quinolizine, M.P. 106°. Hydrobromide, M.P. 196°.

We claim:

1. A process which comprises reacting at a temperature between about 50° C. and about 100° C. a compound having the formula

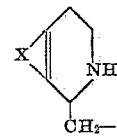

wherein X represents a divalent radical selected from the group consisting of buta-1,3-dien-1,4-ylene; mono(lower alkoxy)buta-1,3-dien-1,4-ylene; di(lower alkoxy)-buta-1,3-dien-1,4-ylene; tri-(lower alkoxy)-buta-1,3-dien-1,4-ylene; and lower alkylenedioxybuta-1,3-dien-1,4-ylene; with a member selected from the group consisting of lower alkyl acrylate and lower alkyl β-halopropionate, thereby forming a compound having the formula

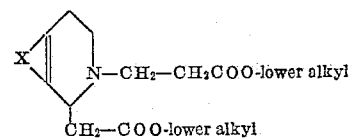

wherein X has the same meaning indicated above; cyclizing the latter compound by heating it in an inert solvent in the presence of a condensing agent selected from the group consisting of an alkali metal alcoholate, boron trifluoride and alkali metal hydride, thereby forming a compound having the formula

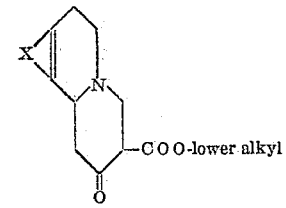

wherein X has the same meaning indicated above; and subjecting the latter compound to hydrolysis-decarboxylation by treating it with a hydrolysis reagent selected from the group consisting of mineral acids and alkaline lyes, thereby forming a compound having the formula

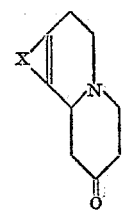

wherein X has the same meaning indicated above.

2. A compound having the formula

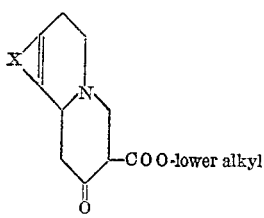

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxy-buta-1,3-dien-1,4-ylene.

3. A process which comprises reacting a compound having the formula

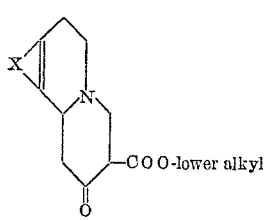

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxy-buta-1,3-dien-1,4-ylene; with a member of the group consisting β-unsaturated 1-halo-lower alkenyl, β-unsaturated 1-halo-lower alkynyl, and β-unsaturated 1-halocyclohexenyl, in an aqueous lye and in the presence of a catalytic quantity of copper, thereby forming a compound having the formula

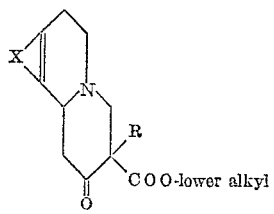

wherein X represents a divalent radical selected from the group consisting of buta-1,3-dien-1,4-ylene; mono(lower alkoxy)-buta-1,3,dien-1,4-ylene; di(lower alkoxy)-buta-1,3-dien-1,4-ylene; tri(lower alkoxy)buta-1,3-dien-1,4-ylene; and lower alkylenedioxybuta-1,3-dien-1,4-ylene; and R represents a member of the group consisting of β-unsaturated lower alkenyl, β-unsaturated lower alkynyl, and β-unsaturated cyclohexenyl; subjecting the latter compound to hydrolysis-decarboxylation by treating it with a hydrolysis reagent selected from the group consisting of mineral acids and alkaline lyes, thereby forming a compound having the formula

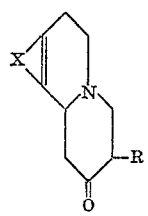

wherein each of X and R has the same meaning indicated above; and hydrogenating the latter compound by catalytic reduction in the presence of a hydrogenation catalyst selected from the group consisting of Raney nickel and palladium, thereby forming a compound having the formula

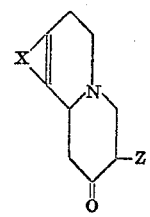

wherein X has the same meaning indicated above and Z represents a member of the group consisting of lower alkyl and cyclohexyl.

4. A process which comprises reacting a compound having the formula

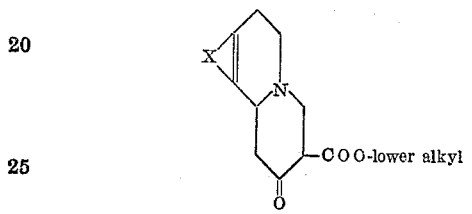

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxybuta-1,3-dien-1,4-ylene; with a member of the group consisting β-unsaturated 1-halo-lower alkenyl, β-unsaturated 1-halo-lower alkynyl, and β-unsaturated 1-halocyclohexenyl, in an aqueous lye and in the presence of a catalytic quantity of copper, thereby forming a compound having the formula

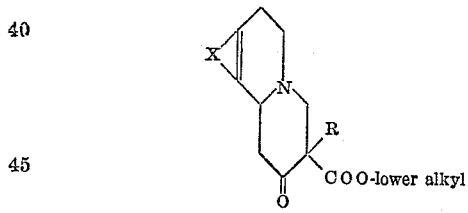

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxybuta-1,3-dien-1,4-ylene; and R represents a member of the group consisting of β-unsaturated lower alkenyl, β-unsaturated lower alkynyl, and β-unsaturated cyclohexenyl; hydrogenating the latter compound by catalytic reduction in the presence of a hydrogenation catalyst selected from the group consisting of Raney nickel and palladium, thereby forming a compound having the formula

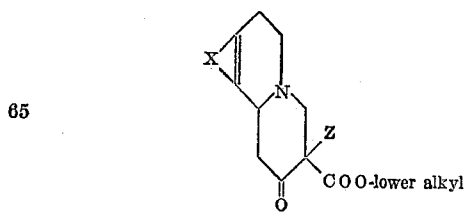

wherein X has the same meaning indicated above, and Z represents a member of the group consisting of lower alkyl and cyclohexyl; and subjecting the latter compound to hydrolysis-decarboxylation by treating it with a hydrolysis reagent selected from the group consisting of mineral acids and alkaline lyes, thereby forming a compound having the formula

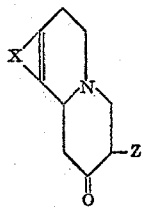

wherein each of X and Z has the same meaning indicated above.

5. A compound having the formula

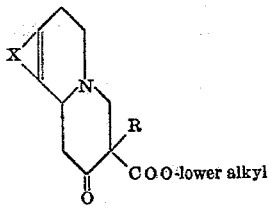

wherein X represents a divalent radical selected from the group consisting of buta-1,3-dien-1,4-ylene; mono-(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxybuta-1,3-dien-1,4-ylene; and R represents a member of the group consisting of β-unsaturated lower alkenyl, β-unsaturated lower alkynyl, and β-unsaturated cyclohexenyl.

6. A compound having the formula

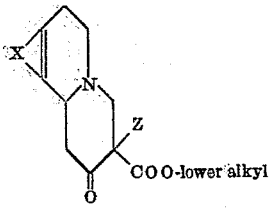

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxy-buta-1,3-dien-1,4-ylene; and Z represents a member of the group consisting of lower alkyl and cyclohexyl.

7. A compound having the formula

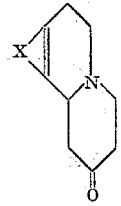

wherein X represents a divalent radical selected from the group consisting of buta-1,3-dien-1,4-ylene; mono(lower alkoxy)-buta-1,3-dien-1,4-ylene; di(lower alkoxy)-buta-1,3-dien-1,4-ylene; tri(lower alkoxy)-buta-1,3-dien-1,4-ylene; and lower alkylenedioxy-buta-1,3-dien-1,4-ylene.

8. 2-oxo-3-lower carbalkoxy-9,10-di(lower alkoxy)-1,2,3,4,6,7-hexahydro-11bH-benzo[a]quinolizine.

9. 2-oxo-3-(lower 2-alken-1-yl)-3-lower carbalkoxy-9,10-di(lower alkoxy)-1,2,3,4,6,7-hexahydro-11bH-benzo[a] quinolizine.

10. 2 - oxo - 3 - lower alkyl-3-lower carbalkoxy-9,10-di (lower alkoxy)-1,2,3,4,6,7-hexahydro-11bH-benzo[a] quinolizine.

11. 2-oxo-9,10-di(lower alkoxy)-1,2,3,4,6,7-hexahydro-11bH-benzo[a]quinolizine.

References Cited in the file of this patent

UNITED STATES PATENTS

| | | |
|---|---|---|
| 2,830,992 | Brossi et al. | Apr. 15, 1958 |
| 2,830,993 | Brossi et al. | Apr. 15, 1958 |

FOREIGN PATENTS

| | | |
|---|---|---|
| 789,789 | Great Britain | Jan. 29, 1958 |

OTHER REFERENCES

Battersby et al.: Experientia, vol. #10 (1950), pages 378–9.

Battersby et al.: Jour. Chem. Soc., 1953, pages 2463–2470.

UNITED STATES PATENT OFFICE
CERTIFICATE OF CORRECTION

Patent No. 3,079,395                           February 26, 1963

Arnold Brossi et al.

It is hereby certified that error appears in the above numbered patent requiring correction and that the said Letters Patent should read as corrected below.

Column 6, line 15, after "hour" insert a period; column 8, line 3, for "2" read -- 3 --; column 12, line 42, after "vol." insert -- 6 --; same column 12, after line 45, insert -- Brossi et al.: Helv. Chim. Acta., vol. #41, pages 121-130 (Feb. 1958). --.

Signed and sealed this 19th day of November 1963.

(SEAL)
Attest:

ERNEST W. SWIDER

Attesting Officer

EDWIN L. REYNOLDS

Acting Commissioner of Patents